(No Model.)
W. H. McCURDY.
ANIMAL RELEASING DEVICE.
No. 402,344. Patented Apr. 30, 1889.
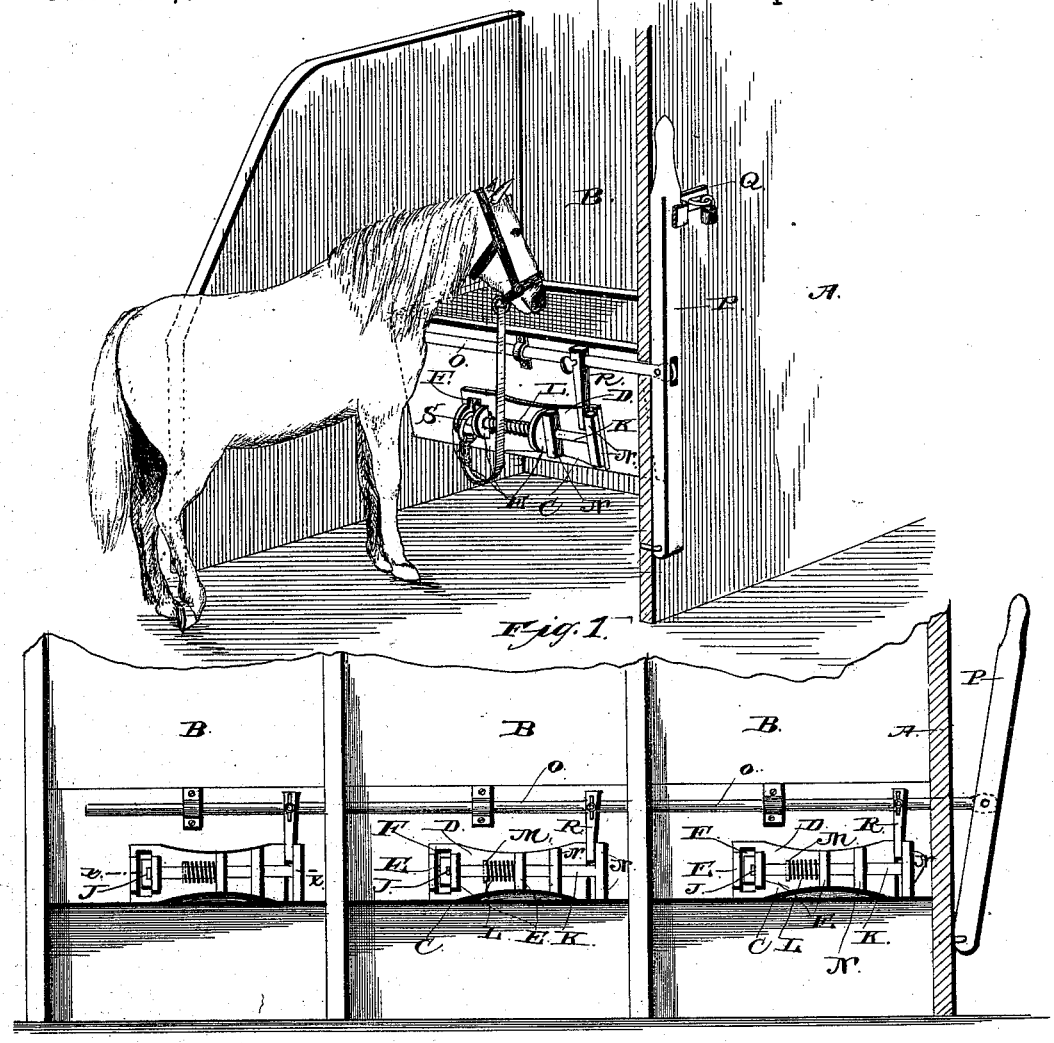
Witnesses,
Geo. F. Thorpe
R. W. Bishop
Inventor,
William H. McCurdy
By his Attorneys

UNITED STATES PATENT OFFICE.

WILLIAM H. McCURDY, OF YORK, PENNSYLVANIA.

ANIMAL-RELEASING DEVICE.

SPECIFICATION forming part of Letters Patent No. 402,344, dated April 30, 1889.

Application filed December 31, 1888. Serial No. 295,018. (No model.)

*To all whom it may concern:*

Be it known that I, WILLIAM H. MCCURDY, a citizen of the United States, residing at York, in the county of York and State of Pennsylvania, have invented new and useful Improvements in Animal-Releasing Devices, of which the following is a specification.

My invention relates to improvements in animal-releasing devices; and it consists in certain novel features hereinafter described and claimed.

In the accompanying drawings, Figure 1 is a perspective view of a portion of a stable, showing my improved device applied thereto. Fig. 2 is a front view, showing the bolts thrown to one side to release the animals; and Fig. 3 is a detail horizontal section on the line *x x* of Fig. 2. Fig. 4 is a similar view, the levers being pulled out.

Referring to the drawings by letter, A A designate the sides of the stable or barn, and B B the stalls at one end of the same, of the usual or any preferred construction. To the front sides of the feed-troughs, at the ends of the stalls, I secure the castings C, which consist of a base-plate, D, and the lugs E, projecting from the front side of the same. The base-plate is provided with a vertical slot, F, near one end, and a notch, G, is formed in the side of the trough in alignment with said slot. The troughs are further provided in their front sides with longitudinal grooves H, which extend from the notches G under the base-plate. A spring-latch, I, is secured at one end in the end of the groove H, and has its other end projecting into the notch G, and provided on its front side with a forwardly-projecting lug, J, which extends through the slot F, as shown most clearly in Fig. 3.

A sliding bolt, K, is mounted in the lugs E, and is projected normally over the slot F by a coiled spring, L, arranged around the bolt between one of the lugs E and a shoulder or pin, M, of the bolt. The bolt K is provided at its free end with the lugs or cross-bars N N, which forms stops or handles by which the bolts are operated.

O designates a horizontal sliding bar or rod, which is mounted on the troughs, above the bolts, and has one end pivoted to a lever, P, which is fulcrumed at its lower end to the side of the barn or stable, and has its upper end clasped by a hasp, Q, secured to the side of the barn or stable. The said hasp can be fastened by a padlock or by a pin, or in any other suitable manner. The sliding bar or rod is provided at proper points of its length with the tappet-arms R, the lower ends of which depend to near the bolts K and play between the lugs N on said bolts. These tappet-arms may be formed integral with the sliding bar or rod, or they may be rigidly secured thereto. I prefer, however, to secure them by set-screws, as they can thereby be quickly adjusted to the proper point of the sliding bar or rod to insure the proper operation of the bolts K.

In practice rings S are attached to the halters of the horses or to chains or straps passing around the necks of the cows, and are forced into and through the slots F, so as to push the free ends of the latches I inward, releasing the lugs J from engagement from the ends of the bolts K, when the springs coiled around said bolts project them across the slots F and through the rings S, thereby securing the animals. When it is desired to release the animals, the lever is vibrated, so as to operate the sliding rod, causing the tappet-arms to strike against the rear lugs or stops of the bolts, and thereby withdraw the same from engagement with the rings and release the animals, the latches I automatically springing into engagement with the ends of the bolts, so as to prevent the same being projected across the slots F by the springs L.

From the foregoing description, taken in connection with the accompanying drawings, it will be seen that I have provided a very efficient device by which the animals will be secured in their stalls, and yet in case of fire can be easily and quickly released, so as to be removed from the stable. The bolts can be arranged on the bottom or either side of the trough; but I prefer to arrange them on the front sides of the troughs, as shown in the drawings. The lever also can be arranged inside the barn or stable, if so preferred, and its upper end may or may not be fastened, as may be desired.

The bolts can be operated singly by hand, if so desired, by manually sliding the same in their bearings, and they are prevented from being projected too far by the coiled springs L, by reason of the inner stops or lugs, N, contacting with the adjacent lug projecting from the front side of the base-plate.

It will be observed that the device is automatic in the operation of securing the animals, as it is only necessary to push the ring through the slot F, so as to disengage the latch I from the end of the bolt K, when the said bolt will at once be forced into engagement with the said ring, so as to prevent its withdrawal. Special stress is laid on this feature in my invention, and I wish it to be understood that I do not limit myself to the exact details of construction shown in the drawings, as many minor changes may be made therein without departing from the invention.

Having thus described my invention, what I claim, and desire to secure by Letters Patent, is—

1. In an animal-releasing device, the combination of the spring-actuated sliding bolt with a spring-latch adapted to engage the end of the bolt, whereby when the ring on the halter-strap is pressed against said spring-latch the bolt will be released and projected through the ring, as set forth.

2. The combination of the sliding bolt, the spring-latch adapted to engage the end of the said bolt, whereby when the ring on the halter-strap is pressed against the spring-latch the bolt will be released and will engage the ring, the sliding bar or rod provided with means adapted to disengage the bolt from the ring, and means for operating said sliding bar or rod, as set forth.

3. The combination of the spring-bolts having lugs at their free ends, the spring-latches adapted to engage the ends of the bolts, whereby when the rings on the halter-straps are pressed against the latches the bolts will be released and will engage the rings, the sliding bar, the tappet-arms carried by said bar and engaging the lugs on the bolts, and means for operating said bar, as set forth.

4. The combination, with the troughs having the notches G and longitudinal grooves H extending therefrom, of the spring-latches secured in said grooves and projecting into said notches and the bolts engaged by said latches, whereby when the rings on the halter-straps are pressed against the latches the bolts will be released and will engage the rings, as set forth.

5. The combination of the base-plate having a slot at one end, the spring-actuated sliding bolt mounted on the base-plate, and the spring-latch arranged below the base-plate and having a projection extending through the slot in the base-plate to engage the end of the bolt, whereby when the ring on the halter-strap is pressed against the latch the bolt will be released and will engage the ring, as set forth.

6. The combination of the base-plate having a slot in one end and lugs projecting from its front side, the sliding bolt mounted in said lugs and having the stop N, adapted to come into contact with one of said lugs, the spring arranged around said bolt and adapted to project the same over the slot, and the spring-latch arranged beneath the base-plate and engaging the bolt to hold it from over the slot, whereby when the ring on the halter-strap is pressed against the latch the bolt will be released and engage the ring, as set forth.

In testimony that I claim the foregoing as my own I have hereto affixed my signature in presence of two witnesses.

WILLIAM H. McCURDY.

Witnesses:
J. H. SIGGERS,
E. G. SIGGERS.